(12) United States Patent
Coon

(10) Patent No.: US 8,681,403 B1
(45) Date of Patent: Mar. 25, 2014

(54) ARTICLES AND METHODS TO PROVIDE COLOR CONSISTENCY OF PRINTED PRODUCTS

(71) Applicant: CooperVision International Holding Company, LP, St. Michael (BB)

(72) Inventor: Mark Coon, Fairport, NY (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 13/573,629

(22) Filed: Sep. 28, 2012

(51) Int. Cl.
*H04N 1/46* (2006.01)

(52) U.S. Cl.
USPC ............................ 358/504; 358/1.9; 358/518

(58) Field of Classification Search
None
See application file for complete search history.

(56) References Cited

U.S. PATENT DOCUMENTS

| | | | | |
|---|---|---|---|---|
| 6,112,665 | A * | 9/2000 | Teter et al. ............ | 101/483 |
| 6,215,562 | B1 * | 4/2001 | Michel et al. .......... | 358/1.9 |
| 7,298,526 | B2 * | 11/2007 | Bailey ................. | 358/1.9 |
| 7,576,890 | B2 * | 8/2009 | Peiro et al. ............ | 358/1.9 |
| 8,289,566 | B2 * | 10/2012 | Yokoyama et al. ...... | 358/1.2 |
| 8,294,947 | B2 * | 10/2012 | Yanagi ................. | 358/1.9 |
| 2004/0212816 | A1 * | 10/2004 | Tanabe et al. ......... | 358/1.9 |
| 2005/0160641 | A1 * | 7/2005 | Camacho et al. ....... | 40/492 |
| 2012/0263379 | A1 * | 10/2012 | Bhatti et al. .......... | 382/167 |

OTHER PUBLICATIONS

Hutcheson, "G7 How-To Guide," A Special Supplement to Graphic Arts Monthly, G7 Bridging the Gap Across All Print Media—Digital, Flexography, Gravure, Offset and Screen, International Digital Enterprise Alliance, Inc., (2001-2009), pp. 1-29.

* cited by examiner

*Primary Examiner* — Dung Tran
(74) *Attorney, Agent, or Firm* — Kilyk & Bowersox, P.L.L.C.

(57) ABSTRACT

A color reference guide is provided for ensuring consistency among color-printed products. The guide can include a plurality of calibration pages and each calibration page can include a calibration bar and a color logo. The calibration bar can be the same on each calibration page and the color logo can be different on each calibration page. A method of providing consistency among color-printed products is also provided and involves comparing a printed logo to a corresponding color logo in the color reference guide. The color reference guide can be used in a variety of printing processes, for example, in a CMYK four-color printing process or in a G7 color printing process. The color reference guide and method are also useful in calibrating a color printer.

20 Claims, 2 Drawing Sheets
(2 of 2 Drawing Sheet(s) Filed in Color)

ARTICLES AND METHODS TO PROVIDE COLOR CONSISTENCY OF PRINTED PRODUCTS

FIELD

The present invention relates generally to the field of color printing and to articles and methods for calibrating color printing systems, thereby providing consistency of colors among color-printed products.

BACKGROUND

Global brand management of corporate logo colors can present challenges when attempting to consistently reproduce such logos from a print perspective. Complexities are magnified when considering various regionally available inks, substrates, and printers. There is a need to provide articles and methods that can remove human subjectivity and provide a standard for evaluating color in printed products.

SUMMARY

The present invention relates to a color reference guide that helps ensure consistency of colors among color-printed products. For example, the color reference guide is useful in calibrating a color printer used to print color-printed products. The color reference guide can include a plurality of calibration pages and each calibration page can include a calibration bar and a color logo. The calibration bar can be the same on each calibration page and the color logo can be different on each calibration page. The color logo on at least one of the calibration pages can differ from the color logo on at least one of the other calibration pages in that they can have different hues. The different color logos can all be of the same size, shape, and design, but of different hues. In some cases, the color logo on each calibration page is of the same design as the color logo on at least one of the other calibration pages, but is printed in a different hue relative to one or more of the other calibration pages.

The calibration bar can be positioned along an edge of each calibration page, for example, positioned at a bottom edge of each calibration page. The plurality of calibration pages can be bound together along an opposite, top edge of each calibration page. The color reference guide can also include binding, such as a spiral binding, and the plurality of calibration pages can be bound together with the binding.

According to various embodiments, each calibration page of the guide can include a color logo and a portion of the same, identical color logo. The portion of the color logo can be positioned flush with an edge of the respective calibration page, wherein the edge is a different edge than the edge with the calibration bar. In some cases, each calibration page can include, in addition to the color logo, a first half-portion of the same, identical color logo, and a second half-portion of the same, identical color logo. The first half-portion can differ from the second half-portion. The first half-portion can be a right half of the full logo, which is positioned flush with a left edge of the respective calibration page, and the second half-portion can be a left half of the full logo, which is positioned flush with a right edge of the respective calibration page.

The present invention also provides a method of calibrating a color printer useful in printing color-printed products. Or, in accordance with the present disclosure, an aspect of the present invention can be understood to be a method of producing color-printed products. The method can involve calibrating the color printer by using the calibration bar of the color reference guide disclosed herein. The color logo shown on a selected one of the calibration pages of the guide can be printed, with the color printer, to form a printed logo on a product other than the color reference guide. The printed logo can then be compared with the color logo on the selected calibration page. The method can then involve determining whether the color printer is properly calibrated or needs calibration, based on the comparison. The comparing can involve overlaying a portion of a color logo from the color reference guide, for example, a left or right portion, on the printed logo, and visually comparing the printed logo to the overlaid portion. The method can also involve printing a color logo shown on a second calibration page of the color reference guide, wherein the second calibration page differs from the first selected calibration page. A second printed logo can thus be formed and compared to the color logo shown on the second calibration page. If it is determined that the printer is not calibrated based on the comparing, then the printer can be adjusted and re-calibrated. In some cases, the print density of at least one color printed by the color printer, is adjusted, based on the comparisons.

The color reference guide can be used in a variety of printing processes, for example, in a CMYK four-color printing process, in a G7 color printing process, or the like.

Thus, by way of the present disclosure, the apparatuses and methods are effective in providing consistency of color among color-printed products by utilizing a color reference guide as disclosed herein.

BRIEF DESCRIPTION OF THE DRAWINGS

The patent or application file contains at least one drawing executed in color. Copies of this patent or patent application publication with color drawings will be provided by the Office upon request and payment of the necessary fee.

The present teachings will be described with reference to the accompanying color drawings. The color drawings are intended to illustrate, not limit, the present invention.

DETAILED DESCRIPTION

Figure 1:
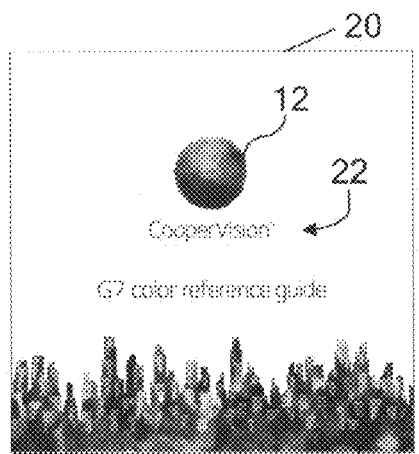
FIG. 1 is a color plan view of the front cover of a color reference guide according to various embodiments of the present invention.

The color reference guide disclosed herein can include a plurality of pages or plates. A calibration bar can be provided on one or more of the pages or plates. Each of the pages or plates, or the majority of them, can be provided with the same calibration bar. Different calibration bars can be provided on different pages or plates, in some embodiments. Herein, where reference may be made to pages alone, it is to be understood that the features and methods described also apply to sets of plates, cards, or other markers that form color reference guides. Such pages that include the calibration bar are referred to herein as calibration pages.

One or more pages of the color reference guide can be provided with one or more settings, initial settings, default settings, preferred media types (e.g., matte paper), preferred weights of paper (e.g., heavyweight paper or 200 gm/m$^2$), preferred media brightness values (e.g., 92 brightness), preferred print quality or dpi values (e.g., 1440 dpi), preferred gloss types for a paper or paperboard to be printed on (e.g., matte finish or high gloss finish), preferred contrast values, or preferred default formulae (e.g., matte finish, heavyweight paper, cyan=+4, magenta=−3, yellow=+4). In some cases, each page that is provided with a calibration bar can also be provided with such information, for example, default printer settings that roughly correspond to the settings expected to accurately copy the logo shown on that page.

The color reference guide can be of any size or shape, for example, a rectangular shape of from about two inches by about two inches, to about four inches by about four inches. In an exemplary case, each page has a square shape having dimensions of about three inches by about three inches.

The color reference guide can be provided with a cover page. The cover page can include identifying information, one or more bar codes, an internet address, a corporate logo, a title, one or more formulae, or other indicia. The cover page can be made of paper, paper stock, cardboard, plastic, metal, wood, or any suitable material. In some cases, a sturdy paper board can be used, for example, having a thickness of from about 0.05 mm to about 1.0 mm, or from about 0.08 mm to about 0.8 mm, or from about 0.1 mm to about 0.5 mm. The cover page can be bound to one or more other pages (e.g., calibration pages) of the color reference guide. The cover page, one or more additional pages of the guide, or all pages of the guide, can be bound together, for example, along the same edge. The pages can be bound together along a top edge, a bottom edge, a left edge, a right edge, a diagonal edge, or the like. The pages of the color reference guide can be bound together with a spiral binding, an adhesive, a flexible binding, a ring binder, a two-ring binder, or the like. The pages can be bound by a spiral binding at a top edge of the color reference guide. In some cases, the color reference guide can comprise a plurality of separate plates, or cards, for example, which can be kept together in a card holder or other retainer.

The cover page of the color reference guide can be made of or include materials, additives, layer thicknesses, combinations thereof, and the like, that protect the color reference guide, prevent light degradation of the guide, and prevent fading and changing of the logo colors and calibration bars in the guide.

The color reference guide can be constructed with a binding that allows for each page of the guide to lay flat. When a page, for example, a corporate logo on a page, is held next to a printed logo for comparison purposes, it can be beneficial to have a color reference guide that lays flat against the printed logo. In some cases, a spiral binding is provided. In some cases, the calibration bar can be provided on an edge of one or more pages, opposite the edge where the pages are bound together.

The calibration guide can include one or more calibrating features, such as a color, plurality of colors, design, plurality of designs, at least one color printed at different print densities, a plurality of colors each printed at more than one print density, one or more numbers or letters, a code, a barcode, other identifying indicia, or the like. Herein, the calibrating features are referred to as a calibration bar. In some cases, the calibration bar can include the colors of a 4-color model, such as the CMYK color model. Each of the four colors of the color model can be provided as part of the calibration bar. In some cases, the calibration bar can include red, green, and blue. In some cases, the calibration bar can include primary colors and secondary colors. In some cases, the calibration bar can include cyan, magenta, yellow, key (black), red, green, and blue. In some cases, the calibration bar includes, the four CMYK colors, each in two or more different print densities. In some cases, one or more of the colors in the calibration bar are shown in two different print densities, three different print densities, four different print densities, or more. In some cases, the calibration bar consists essentially of or consists of, four colors, such as cyan, magenta, yellow, and key (black), which are provided at four different print densities (e.g., 100%, 75%, 50%, and 25%). The calibration bar can be positioned adjacent, or flush with, an edge of the page. Each page that includes a calibration bar is also referred to herein as a calibration page.

Each calibration page can be made of the same material as the coverpage, or of a different material. In some cases, a sturdy paper board can be used, for example, having a thickness of from about 0.05 mm to about 1.0 mm, or from about 0.08 mm to about 0.8 mm, or from about 0.1 mm to about 0.5 mm.

One or more logos, or stylized designs, can be provided on one or more pages (e.g., calibration pages) of the color reference guide. For example, the same logo can be provided on each page of the color reference guide. In some cases, the same logo is provided on each page of the color reference guide, but one or more of the pages show the logo in one or more different hues or tonal families compared to one or more other pages of the color reference guide. Whether or not different colored logos are to be used in commerce, providing different hues for the same logo in the color reference guide can be used to provide accurate printer calibration. The logo can be compared to a printed logo to see whether a printer is calibrated or needs adjustment such as fine calibration.

Although not necessarily included on the cover page, the other pages (e.g., calibration pages) of the color reference guide can be provided with one or more half logos, or logo portions, that can be positioned next to a printed logo of a color-printed product for comparison purposes. Each page including a calibration bar can be provided with one or more logo halves or logo portions. In some cases, a portion of a logo is provided flush with an edge of the page so that it can be laid directly on top of a portion of a printed logo, for example, on top of the remaining portion of the logo, to complete the logo. In some cases, a right half, or right portion, of a logo is provided at a left edge of a page. In some cases, a left half, or left portion, of a logo is provided on a right edge of a page. In some cases, both a left portion and a right portion of a logo can be provided, separate from one another, on a page or on each calibration page of the color reference guide.

In some cases, a full logo can be shown, for example, in the middle of a page, and a left portion and a right portion of the same logo can also be provided on the same page. A set of a full logo and two different logo portions can be provided on each calibration page of the color reference guide. In an exemplary embodiment, the first half portion and the second half portion can together form the entire full logo provided on the calibration page, and each half does not necessarily need to make up exactly 50% of the full logo. The two halves can make up 40% and 60%, respectively, of the full logo, 30% and 70%, respectively, of the full logo, or any other split of the full logo. In some cases, each of the two halves can be less than 50% of the full logo, or more than 50% of the full logo.

The color reference guide and methods described herein can be used to ensure color consistency among color-printed products, or used to calibrate any printing system and evaluate printed logos that have been printed from any printing system, or combinations thereof. For example, the color reference guide can be used to calibrate an inkjet printing system, a bubble jet printing system, a laser printing system, a digital printing system, a flexography printing system, a gravure printing system, an offset printing system, a screen printing system, or the like.

As shown in FIG. 1, a cover page 10 is provided for a color reference guide according to the present disclosure. Cover page 10 can be provided bound to other pages of the same color reference guide or can be unbound, but included, with other pages of the color reference guide. Cover page 10 can include a corporate logo 12, other logo, stylized design, or indicia. Cover page 10 can be square, rectangular, polygonal, or of any other shape. A planar, square shape can be used. Cover page 10 can include one or more edges, for example, a top edge 20. Cover page 10 can include additional indicia, identifying information, a title, calibration information, a code, and/or an indication that the cover page is part of a color reference guide.

Figure 2:
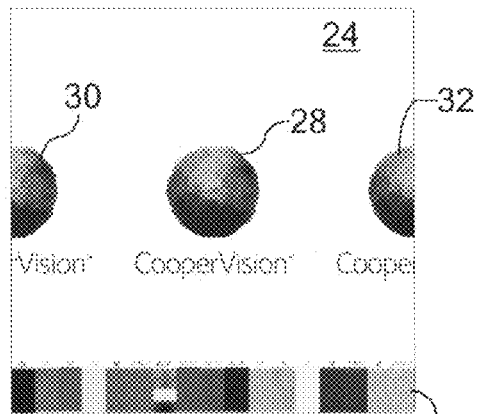
FIG. 2 is a color plan view of page two of a color reference guide according to various embodiments of the present invention, showing a calibration color bar at the bottom of the page and a logo printed in blue, indigo, and violet tonal families.

FIG. 2 is a color view of page 2 of a color reference guide according to the present disclosure. Page two 24 can be part of the same color reference guide as cover page 10 shown in FIG. 1. Page two 24 can be made of the same material or stock as cover page 10 shown in FIG. 1, or it can be made of a different material, stock, or weight. A calibration bar 26 is provided at the bottom edge of page two 24. The bottom edge can be understood to be the edge opposite the edge where the binding of the color reference guide is located, if provided. Page two 24 can also include a full corporate logo 28, a right portion 30 of corporate logo 28, and a left portion 32 of corporate logo 28. Right portion 30 can be positioned immediately adjacent, that is, flush, with the left edge of page two 24. Left portion 32 can be positioned flush with the right edge of the page. Corporate logo 28, right portion 30, and left portion 32, can be printed in colors of the same hues and tonal families, for example, of blue, indigo, and violet tonal families.

Figure 3:
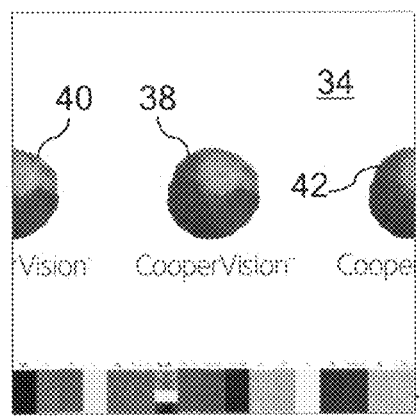
FIG. 3 is a color plan view of page three of a color reference guide according to various embodiments of the present invention, including the same calibration color bar shown in FIG. 2 and the same logo shown in FIG. 2 but wherein the logo has been printed in green and blue tonal families.

FIG. 3 is a color view of page three 34 of a color reference guide, and can also be a part of the color reference guide that includes cover page 10 and page two 24. Like page two 24 shown in FIG. 2, page three 34 includes the same calibration bar 26 at the same location on the page, specifically, at the bottom of the page. Page three 34 also includes a corporate logo 38, of the same design as corporate logo 28 shown in FIG. 2, but printed in different hues. Corporate logo 38 includes green and blue tonal families. Page three 34 also includes right portion 40 and left portion 42 of full corporate logo 38, which are printed in the same tonal families as full corporate logo 38.

Figure 4:
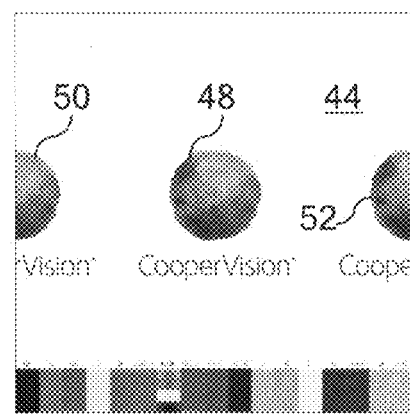
FIG. 4 is a color plan view of page four of a color reference guide according to various embodiments of the present invention, including the same calibration color bar shown in FIG. 2 and the same logo shown in FIG. 2 but wherein the logo has been printed in yellow and green tonal families.

FIG. 4 is a color view of page four 44 of a color reference guide. Page four 44 can be part of the same color reference guide as the pages shown in FIGS. 1-3, and like page two 24 and page three 34, page four 44 includes the same calibration bar 26 in the same location, that is, along the bottom edge of the page. Page four 44 includes a full corporate logo 48, which is of the same design as corporate logos 28 and 38, but which is printed in yellow and green tonal families. Similarly, right portion 50 and left portion 52 of full corporate logo 48 are printed in the same yellow and green tonal families as used for full corporate logo 48.

Figure 5:
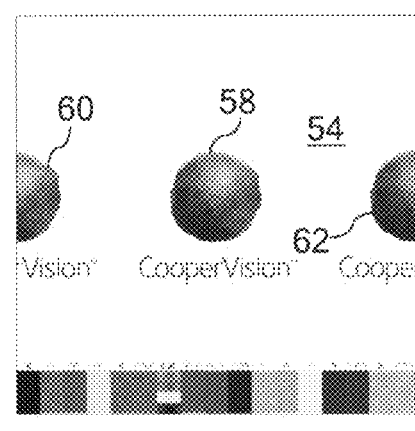
FIG. 5 is a color plan view of page five of a color reference guide according to various embodiments of the present invention, including the same calibration color bar shown in FIG. 2 and the same logo shown in FIG. 2 but wherein the logo has been printed in a red tonal family.

FIG. 5 is a color view of page five 54 of the same color reference guide that includes the pages shown in FIGS. 1-4. Page five 54 includes calibration bar 26 along the bottom edge thereof, a full corporate logo 58, and a right portion 60 and a left portion 62 of full corporate logo 58. Full corporate logo 58 and portions 60 and 62 thereof are all printed in the same red tonal family.

Figure 6:
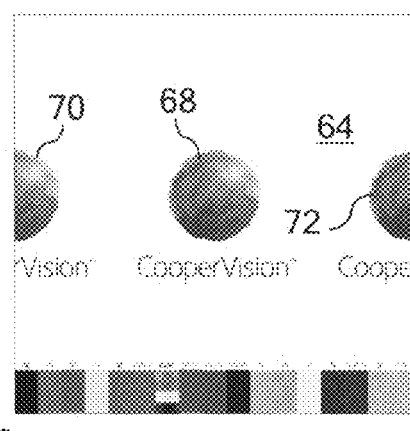
FIG. 6 is a color plan view of page six of a color reference guide according to various embodiments of the present invention, including the same calibration color bar shown in FIG. 2 and the same logo shown in FIG. 2 but wherein the logo has been printed in red, orange, and yellow tonal families.

FIG. 6 is a color view of a page six 64 of the same color reference guide that includes the pages shown in FIGS. 1-5. Page six 64 includes calibration bar 26 along a bottom edge thereof, a full corporate logo 68 printed in red, orange, and yellow tonal families, and right portion 70 and left portion 72 of full corporate logo 68. Portions 70 and 72 are printed in the same tonal families as full corporate logo 68 and are positioned flush with the left edge and right edge, respectively, of the page.

Figure 7:
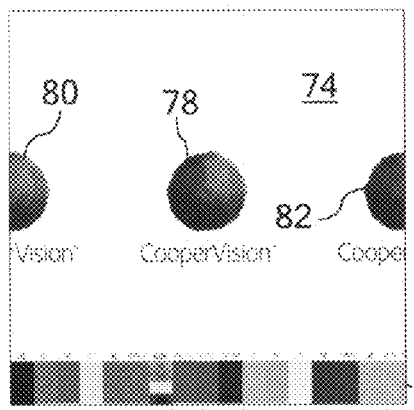
FIG. 7 is a color plan view of page seven of a color reference guide according to various embodiments of the present invention, showing the same calibration color bar shown in FIG. 2 and the same logo shown in FIG. 2 but wherein the logo has been printed in indigo and violet tonal families.

FIG. 7 is a color view of a page seven 74 of the same color reference guide that includes the pages shown in FIGS. 1-6. Page seven 74 includes calibration bar 26 along a bottom edge thereof, a full corporate logo 78 in indigo and violet tonal families, and right portion 80 and left portion 82 of full corporate logo 78. As with the other calibration pages of the color reference guide, right portion 80 and left portion 82 are printed in the same tonal families as full corporate logo 78 and positioned flush with the left side and right side, respectively, of page seven 74.

Figure 8:
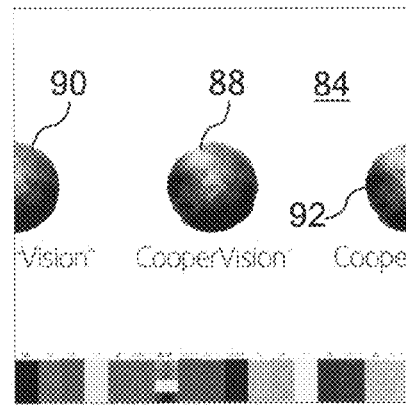
FIG. 8 is a color plan view of page eight of a color reference guide according to various embodiments of the present invention, showing the same calibration color bar shown in FIG. 2 and the same logo shown in FIG. 2 but wherein the logo has been printed in a black tonal family.

FIG. 8 is a color view of page eight 84 of the same color reference guide that includes the pages shown in FIGS. 1-7. Page eight 84 includes calibration bar 26 at a bottom edge of the page, full corporate logo 88 in a black tonal family, and right portion 90 and left portion 92 of full corporate logo 88. Portions 90 and 92 are printed in the same tonal family as full corporate logo 88 and are positioned flush with the left edge and right edge, respectively, of the page.

Any combination of, or all of, the pages shown in FIGS. 1-8 can be combined together to form a color reference guide according to the present disclosure. The pages can be bound together as discussed herein, or kept separate. Although calibration bar 26 shown in FIGS. 2-8 is a G7 calibration bar, it is to be understood that the calibration bar could be of a different type, for example, a CMYK calibration bar, a black ink only calibration bar, or the like. Besides the cover page, the color reference guide can include the same, identical calibration bar on each page of the guide. The same logo design can be provided on each page of the guide, or, on each calibration page of the guide. The logo on each calibration page can be printed in different hues and/or tonal families relative to the hues and/or tonal families used for the logo on one or more other calibration pages of the guide. It is to be understood that, while left portions and right portions of the different colored logo are provided on the calibration pages, top portions, bottom portions, single portions, or other portions of the respective full logo on the page can instead or additionally be provided on the calibration pages of the guide.

The color reference guide can include a cover and seven different calibration pages. Each calibration page can have a calibration bar, which is identical to the calibration bar on each of the six other calibration pages. The cover and calibration pages can be bound together at an edge of each that is opposite the calibration bar, for example, the cover and calibration pages can be bound at a top edge of each and the calibration bar can be positioned at the bottom edge of each calibration page. Each calibration page can have a full logo centrally positioned on the page, a left-half of the logo on the right edge of the page, and a right-half of the logo on the left edge of the page. Each calibration page can have a logo which is of the same shape but of different hue or of one or more different tonal families relative to the logo on each of the six other calibration pages. One of the calibration pages can have its logo colored in blue, indigo, and violet tonal families. One of the calibration pages can have its logo colored in green and blue tonal families. One of the calibration pages can have its logo colored in yellow and green tonal families. One of the calibration pages can have its logo colored in a red tonal family. One of the calibration pages can have its logo colored in red, orange, and yellow tonal families. One of the calibration pages can have its logo colored in indigo and violet tonal families. One of the calibration pages can have its logo colored in a black tonal family.

The present color reference guide can be produced by printing a calibration bar on a plurality of pages, and printing a color logo on each of the pages that include a calibration bar. The calibration bar can be the same on each calibration page. The calibration bar can be printed along an edge of each calibration page. Combinations of a full logo and logo portions, for example, two different half-logos, can be printed on each page that has a calibration bar. Logos of the same shape, but of different tonal families, can be printed on different respective pages that contain calibration bars. The logos, logo portions, and calibration bars can be printed in any order. The thus-formed pages can be referred to as calibration pages.

The printing can be accomplished using conventional printing machines and methods, as understood by persons of ordinary skill in the art. A cover can be provided over the first page of the plurality of calibration pages. The calibration pages, and optionally the cover, can be bound together to produce the present color reference guide. The calibration pages and the cover page can be stacked together and a binding can be formed along an edge of the stack, for example, along a top edge of each calibration page and along a top edge of the cover page. The edges of the calibration pages that are bound can be opposite the edges where the calibration bar in printed. A spiral binding can be used and forming the binding can involve punching holes along the edges of the calibration pages and the cover. The edges can be bound by gluing, using hot-melt adhesive, sewing, punching and binding, or the like. Each of the pages shown in FIGS. 1-8 can be used together to form a color reference guide.

Figure 9:
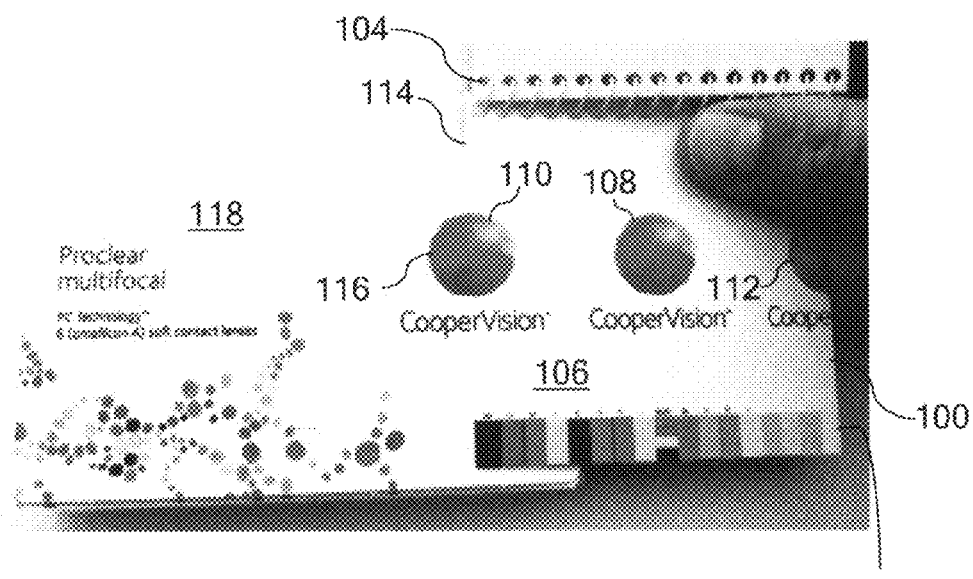
FIG. 9 is a color photograph of a calibration page of a color reference guide according to the present invention, showing a logo that has been printed in red, orange, and yellow tonal families, being compared to a printed logo comprising the same tonal families, wherein the logo on the calibration page overlays about half of the printed logo.

FIG. 9 is a color photograph depicting a method of evaluating a printed logo by comparing the printed logo to a color reference guide 100 according to the present disclosure. Color reference guide 100 can comprise a plurality of pages, including page 106, bound together, for example, with a spiral binding 104 as shown. Each page of color reference guide 100 can be provided with the same calibration bar 102, with the exception of a cover page, although the cover page can optionally also be provided with the calibration bar. Calibration bar 102 shown in FIG. 9 is a CMYK calibration bar as opposed to a G7 calibration bar. Page 106 of color reference guide 100 includes a full corporate logo 108, a right portion 110 of the full corporate logo, and a left portion 112 of the full corporate logo. Right portion 110 of full corporate logo 108 is positioned flush with and along the left side edge 114 of page 106. Full corporate logo 108 can be compared to a printed logo 116 on a printed page 118 by overlaying right portion 110 onto the right-hand side of printed full corporate logo 116, so as to complete a second full corporate logo. The second full corporate logo is thus made up of a left half or left portion of printed logo 116 and a right half or right portion 110 from page 106 of color reference guide 100. The left side of printed logo 116 can be compared to right portion 110 and the resulting two-part logo can be compared to full corporate logo 108. If the color, hue, tint, shade, or any other aspect of printed logo 116 does not compare well with full corporate logo 108, adjustments can be made to the printer, inks, or both, and optionally the comparative method can be performed again.

Adjustments can be made, and color image processing can be implemented, as described, for example, in U.S. Pat. No. 8,040,560 B2, U.S. Pat. No. 7,231,084 B2, or as described in *G7 Proof to Print Process; Guidelines and Specifications*, IdeAlliance, International Digital Enterprise Alliance, 2007, pp. 48-64, which are incorporated herein in their entireties by reference.

Comparisons between printed logos and those shown in the color reference guide can be made by visual comparisons or by using a scientific measuring instrument such as a colorimeter, a spectrometer, a spectrophotometer, an absorbance spectrophotometer, or the like.

It is apparent that variations and modifications to the present teachings are possible without departing from the scope and spirit of the teachings. It is therefore to be understood that the appended claims are to be construed as encompassing all features of patentable novelty that reside in the present teachings, including all features that would be treated as equivalent thereof by those skilled in the art to which the present teachings pertain. All U.S., International, and foreign patents and publications, as well as non-patent literature, referred to herein are hereby incorporated herein by reference in their entireties to the same extent as if each individual publication, patent, or patent application was specifically and individually indicated to be incorporated by reference.

What is claimed is:

1. A color reference guide for providing consistency among color-printed products, the color reference guide comprising a plurality of calibration pages, each calibration page including a calibration bar and a color logo, the calibration bar being the same on each calibration page and the color logo being different on each calibration page, wherein the color logo on at least one of the calibration pages differs from the color logo on at least one of the other calibration pages by comprising a different hue.

2. The color reference guide of claim 1, wherein the color logo on each calibration page is of the same design as the color logo on at least one of the other calibration pages but differs in hue.

3. The color reference guide of claim 1 wherein the calibration bar is positioned along an edge of each calibration page.

4. The color reference guide of claim 1, wherein the calibration bar is positioned at a bottom edge of each calibration page and the plurality of calibration pages are bound together along an opposite, top edge of each calibration page.

5. The color reference guide of claim 1, further comprising a cover page configured to protect the calibration pages from light degradation.

6. The color reference guide of claim 5, further comprising a spiral binding, wherein the plurality of calibration pages and the cover page are bound together with the spiral binding, with the cover page on top.

7. The color reference guide of claim 1, wherein each calibration page comprises the respective color logo and a portion of the color logo, the portion of the color logo being positioned flush with an edge of the respective calibration page.

8. The color reference guide of claim 1, wherein each calibration page, in addition to the respective color logo included thereon, further comprises a first half-portion of the respective color logo, and a second half-portion of the respective color logo, and wherein the first half-portion differs from the second half-portion.

9. The color reference guide of claim 8, wherein the first half-portion comprises a right half of the color logo positioned flush with a left edge of the respective calibration page, and the second half-portion comprises a left half of the color logo positioned flush with a right edge of the respective calibration page.

10. The color reference guide of claim 1, wherein the calibration bar comprises a CMYK four-color calibration bar.

11. The color reference guide of claim 1, wherein the calibration bar comprises a G7 calibration bar.

12. The color reference guide of claim 1, wherein the calibration bar comprises at least one color printed at, at least two different densities.

13. The color reference guide of claim 1, wherein the color logo on each calibration page comprises one or more hues and one or more tonal families of each respective hue.

14. A method of providing consistency among color-printed products, comprising:
  calibrating a color printer by using a calibration bar of a color reference guide, the color reference guide comprising a plurality of calibration pages, each calibration page including a calibration bar and a color logo, the calibration bar being the same on each calibration page and the color logo being different on each calibration page, wherein the color logo on at least one of the calibration pages differs from the color logo on at least one of the other calibration pages by comprising a different hue;
  printing the color logo shown on a selected one of the calibration pages of the color reference guide, with the color printer, to form a printed logo;
  comparing the printed logo with the color logo on the selected calibration page; and
  determining whether the printed logo exhibits color consistency with the color logo on the selected calibration page, based on the comparing.

15. The method of claim 14, wherein the selected calibration page comprises the respective color logo and a portion of the respective color logo, and the comparing comprises overlaying the portion on the printed logo and visually comparing the printed logo to the overlaid portion.

16. The method of claim 14, further comprising printing, with the color printer, the color logo shown on a second calibration page of the color reference guide, the second calibration page differing from the first selected calibration page, to form a second printed logo, and comparing the second printed logo to the color logo shown on the second calibration page.

17. The method of claim 14, further comprising adjusting the print density of at least one color printed by the color printer, based on the comparing.

18. A method of calibrating a color printer, comprising:
  calibrating a color printer by using a calibration bar of a color reference guide, the color reference guide comprising a plurality of calibration pages, each calibration page including a calibration bar and a color logo, the calibration bar being the same on each calibration page and the color logo being different on each calibration page, wherein the color logo on at least one of the calibration pages differs from the color logo on at least one of the other calibration pages by comprising a different hue;
  printing the color logo shown on a selected one of the calibration pages of the color reference guide, with the color printer, to form a printed logo;
  comparing the printed logo with the color logo on the selected calibration page; and
  determining whether the color printer is calibrated or needs further calibration based on the comparing.

19. The method of claim 18, wherein the selected calibration page comprises the respective color logo and a portion of the respective color logo, and the comparing comprises overlaying the portion on the printed logo and visually comparing the printed logo to the overlaid portion.

20. The method of claim 18, further comprising printing, with the color printer, the color logo shown on a second calibration page of the color reference guide, the second calibration page differing from the first selected calibration page, to form a second printed logo, and comparing the second printed logo to the color logo shown on the second calibration page.

* * * * *